Sept. 1, 1970  J. W. JENSEN ET AL  3,526,432
SWIVELLING BELT CONNECTOR
Filed March 13, 1968  3 Sheets-Sheet 1

INVENTORS
DAVID L. LANG
JAMES T. LIGON
JAY WALTER JENSEN
BY
Miller Morris Pappas & McLeod
ATTORNEYS

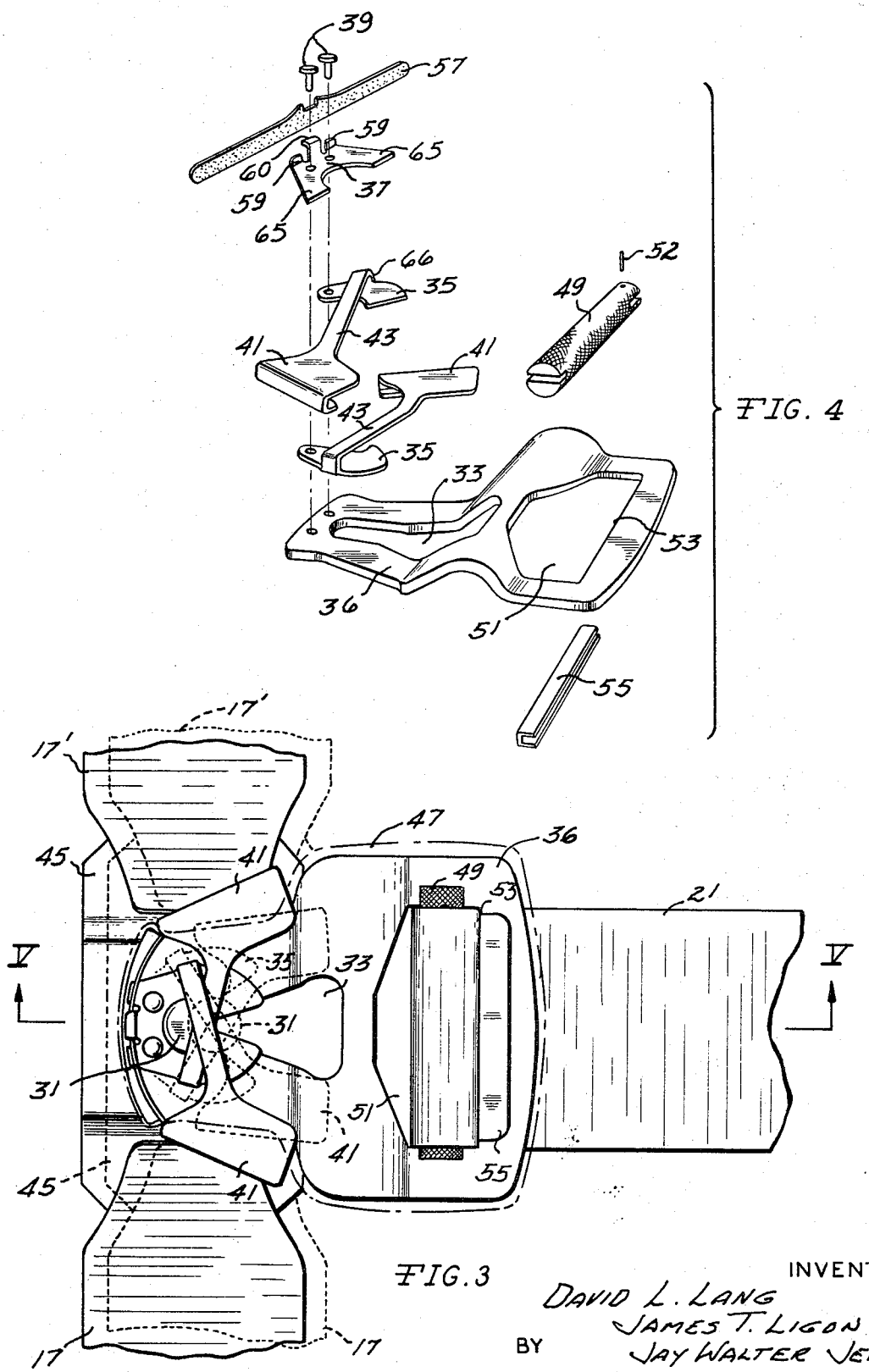

Sept. 1, 1970  J. W. JENSEN ET AL  3,526,432
SWIVELLING BELT CONNECTOR

Filed March 13, 1968  3 Sheets-Sheet 3

INVENTORS
DAVID L. LANG
JAMES T. LIGON
JAY WALTER JENSEN
BY
ATTORNEYS

United States Patent Office 3,526,432
Patented Sept. 1, 1970

3,526,432
SWIVELLING BELT CONNECTOR
Jay Walter Jensen, Utica, David L. Lang, Rochester, and James T. Ligon, Almont, Mich., assignors to The Firestone Tire & Rubber Company, Akron, Ohio, a corporation of Ohio
Filed Mar. 13, 1968, Ser. No. 712,840
Int. Cl. A44b 17/00; A62b 35/00
U.S. Cl. 297—389                             10 Claims

ABSTRACT OF THE DISCLOSURE

An apparatus for connecting the loose ends of at least two separable structures. There are two major assemblies, first a base with a projecting swivel post, the base being attached to at least one of the separable structures to be joined. The other assembly is a latch mechanism which is attached to another of the separable structures to be joined. This assembly includes a frame, and an elongated slot in the frame which locks over the swivel post of the base structure. Spring loaded jaws are mounted to the frame and manually opened, the swivel post being moved through the slot into the jaws which are then closed upon a circumferential groove on the swivel post, to hold the swivel post in one end of the slot. The jaws are provided with squeezable pinch grip extensions so that the jaws may be easily opened manually to quickly release the two assemblies for separation thereof. A particular sliding, free ended leaf spring is disclosed as resilient means to maintain the jaws closed, the entire apparatus being particularly suited to the connection of a harness belt to a lap belt in automobile passenger safety apparatus.

BACKGROUND OF THE INVENTION

Safety lap belts are well known, having been introduced many years ago for passengers in airplanes, and subsequently have been widely used in automobiles. However, accidents causing serious bodily injuries have continued to occur with unacceptable frequency in this country and elsewhere, and therefore prodigious efforts are still being directed to the protection of automobile passengers against injuries sustained from vehicular impacts. One of the promising developments currently being introduced is the shoulder harness which is essentially a restraint belt which extends from an anchored point somewhere at or below the passenger's lap belt, across his chest and thence up to a second point of anchoring above and behind the passenger's head, on the automobile frame or a pillar thereof. Such restraint, among other things, limits the passenger's torso from pitching forward in an impact and crashing the head, face, or other bodily parts against such automobile structures as the dash board, steering wheel, or the back of the front seat in the case of a rear seat passenger.

Particular references which may be useful in illustrating the present state of the art, as well as illuminate a setting in which the present invention is conveniently placed, are the disclosures of U.S. Pats. No. 3,233,941; 3,227,490; and 3,294,444. The first of these shows the general lap belt and shoulder harness combination in which the present invention finds an immediate application. The second reference shows a particular means for connecting a shoulder belt to a lap belt. The third mentioned reference illustrates the closest known disclosure of a belt connecting, pinch grip operated, swivelling belt connector. The mechanism is directed to the connection of lap belt ends, rather than the connection of an extraneous belt, such as a shoulder harness, to the lap belt, from a skew angle of approach.

SUMMARY OF THE INVENTION

The present invention introduces a novel apparatus for making the connection of a shoulder belt to a lap belt, at any selected point on the lap belt. In general, an anchoring unit is attached to the lap belt. The base member is of a material and design to withstand impact loads, and to distribute such loads to the lap belt structure, so as not to tear the belt or otherwise become disconnected therefrom under stress. A suggested attachment is a clamp or lock structure which can be securely pinched onto the lap belt. A tested structure is one embodying standard belt connect design, namely that which severs the lap belt at the selected connect point and splices the base member into the lap belt thereat, the base member having end slots through which the lap belt ends are threaded and loop closed by stitching.

The base member has a swivel post projecting normally outward from the plane of the attached lap belts. The post has a locking groove around its circumference, at a point spaced somewhat apart from the plane of the lap belts. By means of the swivel post, connection is made to a latch structure on the harness belt, as described below.

The latch assembly is attached to the harness belt by a main frame member. An expedient form of attachment is a standard loop and stitch connection of the harness belt through a belt slot in one end of the frame. The frame forms somewhat of an extension of the harness belt, and is provided with an elongate slot running in this extended direction to one end adapted for seating or nesting of the swivel post. To make a connection the latch slot is dropped over the swivel post anchored to the lap belt. If an impact should occur, the forward pitch of the occupant's torso will place the shoulder harness in tension which draws the swivel post end of the latch assembly slot up tight against the post i.e. tending to shear the post and thereby transmit the harness tension to the lap belt. It can be immediately observed, however, that some means are required to keep the swivel post from falling, slipping, or otherwise withdrawing from the latch slot. This is accomplished by a pair of resiliently closed jaws mounted on the latch frame so as to close on the swivel post in circumferential engagement with the groove thereon. When the jaws lock into the groove the swivel post cannot slide, in its axial direction, out of the slot. The jaws are provided with a pair of overcrossed lever arms which may be manually squeezed to open the jaws and allow the swivel post to withdraw from the latch slot, and thereby disconnect the shoulder harness from the lap belt.

The jaws, by virtue of locking into the swivel post groove, restrain the post from withdrawing from the slot but do not inhibit free rotation of the swivel post in the latch frame slot, and consequently the latch frame may swivel freely with respect to the lap belt orientation; thus a shoulder harness may have any desired connecting approach angle to the lap belt as desired, in accordance with the locus of the remainder of the belt, its attachment point at the opposite end, and the shifting position of the user's body.

Refinements are provivded in the form of the spring means which hold the jaws normally closed: A leaf spring is mounted to the latch frame only, but not to the jaw arms against which the spring presses. Rather, the leaf spring is presented to the jaw levers in a contact which slides on the jaw arms when they are actuated. This substantially reduces the degree of flexure transmitted to the spring under jaw movement. It thus greatly minimizes the fatigue to which the spring is subjected. And, it eliminates the problem of spring fracture or spring detachment at the point of fastening (e.g. by rivets), to the jaws, due to strain at this point of connection. This is so, because, as already explained, there is, in the present invention, no such point of connection.

Accordingly it is an object of the present invention to provide a swivelling connector.

It is another object of this invention to provide a slot and post type swivelling connector of very simple and economical construction.

Another object of the present invention is to provide a squeeze operated swivelling snap connector for quick connect and disconnect between joining, separable structures, particularly belt or other flexible structures.

Still another object of the present invention is to provide a squeeze operated, swivelling, quick snap connector for attachment between harness and lap belt as known in vehicle safety equipment.

A still further object of the present invention is to provide a quick disconnect, swivelling snap connector having squeeze operated resilient locking jaws with resilient closing means which are relatively free from early breakdown.

Still other objects will be present upon reading the present description, drawings and claims.

In the drawings:

FIG. 3 is a view similar to FIG. 2, and completes the connecting sequence of operations, the first step of which was shown in FIG. 2, and the final steps being shown in the alternate position lines, and heavy lines, respectively, of the FIG. 3.

FIG. 4 is an exploded view of the entire latch assembly, except for the cover and belt, of the present invention.

DESCRIPTION OF THE PREFERRED EMBODIMENT

Figure 1:
FIG. 1 is a front elevation view of an automobile body (shown in section) with a front seated passenger confined by a shoulder harness and lap belt which are shown swivelly joined by a connector of the present invention.

FIG. 1 shows a typical and pertinent setting for the apparatus of the present invention, viz, an automobile body 11, a passenger 13 on seat 15 inside the body 11. The passenger is constrained by safety lap belt segments 17 and 17' (which are buckled together at 19) and harness belt 21 attached at one end to the automobile frame, body, or pillar, as shown at 23 somewhat above and behind the passenger's head. The harness belt 21 is attached at its lower end 25 to one side of the lap belt 17. At 23 a retractor, as is now known to the art, might be employed.

Specific means of connecting the harness belt 21 to lap belt 17 is a considered object of the present invention, which may be seen in detail by reference to FIGS. 2 through 7.

Figure 2:
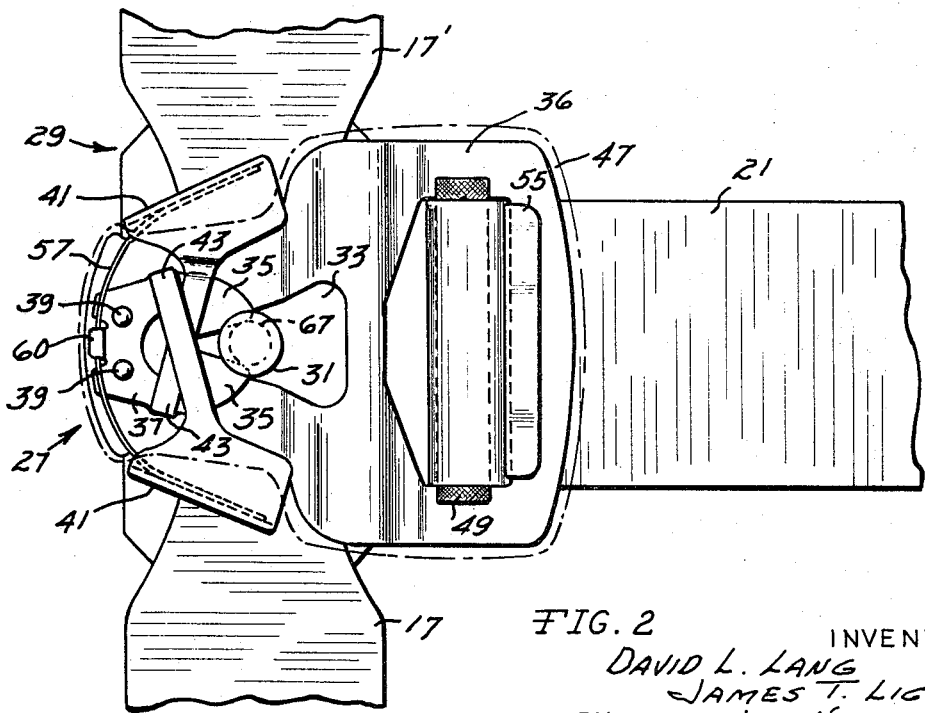
FIG. 2 is a top plan view of the latch assembly of the connector of the present invention (with the cover therefor transparently represented by broken line), and shows the snap jaws as closed and being addressed by the swivel post, which is disposed for entry to the jaws, when opened.
Figure 5:
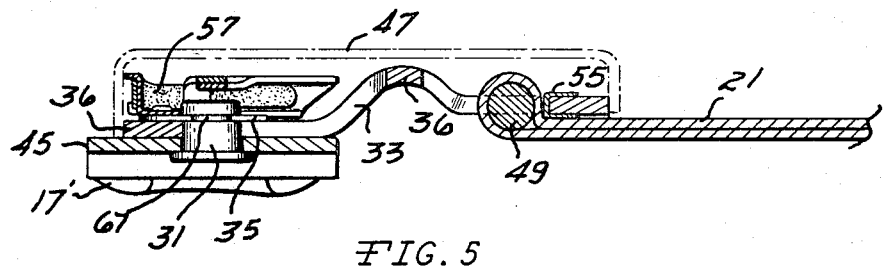
FIG. 5 is a sectional view taken on lines V—V of FIG. 3 and shows the latch assembly of the present invention, as swivelly connecting a harness belt to an anchor unit on a lap belt.

FIG. 2 shows the relative positions of the latch assembly 27 and attached harness belt 21, with respect to the anchor member 29 and attached lap belt portions 17 and 17'. The swivel post 31 is shown disposed in the irregular slot 33 on latch plate 36. The jaws 35 are mounted to the latch plate 36 underneath the spring plate 37, the rivets 39 serving to connect both the spring plate and snap jaws to the latch plate, as well as provide pivot points for each of the jaws 35. The swivel post 31 is about to be received by the jaws 35, subsequent to their opening as shown in phantom line in FIG. 3. The jaws are opened by pressing manually inwardly, i.e. squeezing, the finger levers or press portions 41 at the extremities of the cross over arms 43 which extend up and then across from each of the jaws 35.

The squeezed position is shown in phantom line in FIG. 3, as is the resultant opened position of the jaws 35. In conjunction with this open jaw position is shown, also in phantom line, the corresponding swivel post position. The post 31 is depicted closer to the narrow slot end than in FIG. 2. The latch plate, is rigidly attached to the lap belt portions 17 and 17' via the base plate 45, and therefore all these structures also shown in an intermediate position, in phantom line.

The final position of pivot swivel post 31 is also seen in FIG. 3, in heavy line which shows also the corresponding final, locked, position of the base plate 45 and lap belt 17 and 17'. Thus FIGS. 2 and 3 show three sequential positions of the latch structure relative to the swivel post 31 on the lap belt anchor assembly. Summarizing, FIG. 2 shows the swivel post 31 inserted into the wider end of latch slot 33, and just approaching the closed jaws 35. In FIG. 3 the phantom line position shows the swivel post 31 passing through the opened jaws 35, and finally the heavy lines in FIG. 3 show the swivel post 31 locked between the reclosed jaws 35, and the finger levers 41 spread back out to their normal position. This sequence substantially describes the operation of the preferred embodiment.

FIG. 4 shows an exploded view of all the parts of the latch assembly only, without its cover 47, or the harness belt 21. The harness may be seen in FIG. 3 to be connected to the latch plate 36 via looped connection about the knurl bar 49. The knurl bar is slot connected across the irregular belt slot 51 and retained therein by retainer pin 52. Belt friction and fraying at the end 53 of belt slot 51, is minimized by the slip lip 55 which is press clipped over the edge 53, as shown in the section view of FIG. 5. Returning to FIG. 4, the latch assembly will be explained. Rivets 39 connect the spring clip 37 to the latch plate 36 with the snap jaws 35 sandwiched therebetween. Each jaw pivots on one of the rivets 39. The leaf spring 57 is fastened to the spring clip 37 between the lower pinch tabs 59 and upper tab 60.

Figure 6:
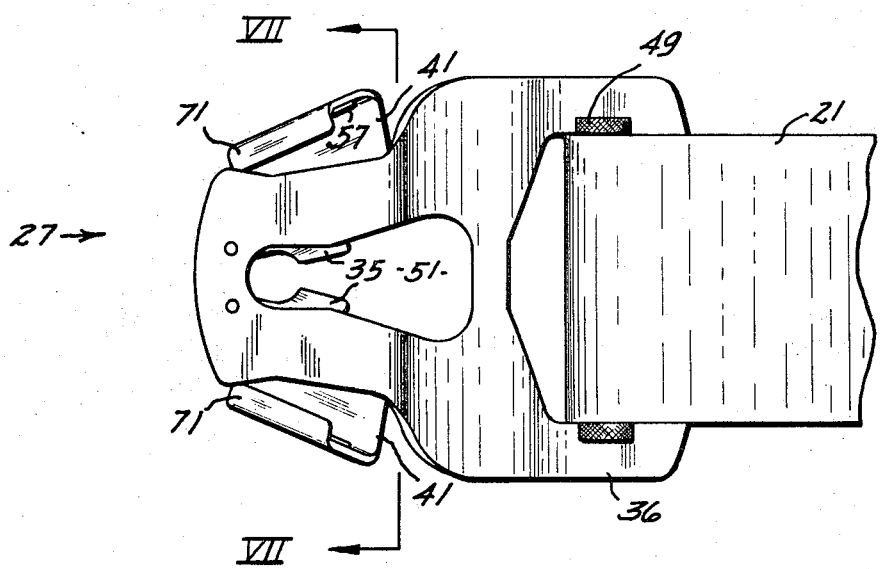
FIG. 6 is a bottom plan view of the latch assembly of the present invention.

In FIG. 4 the leaf spring is shown in its unrestrained, straightened configuration, but under assembly the leaf spring is bowed into a loaded condition between the finger levers 41 of the cross over arms 43 (see FIGS. 2 and 6). The ear portions 65 of spring clip 37 extend into the space between the jaw 35 and cross over arm 43 and abut against the inner face of the riser portion 66, of the arm 43. This abutment serves to delimit the extent of inward swing of the jaws toward the closed position. Thus the inward closure of the jaws 35 is arrested in the position shown in FIG. 2, so that a slight opening always is present to facilitate insertion of the swivel post 31.

Once the post is completely engaged in the narrow, or swivel, end of slot 33, and encircled by the jaws 35, it is constrained from slipping out of the slot by the groove 67 which extends circumferentially around the post 31. As can best be seen in FIG. 5 the jaw 35 locks into the groove 67 and restrains the swivel post from axial displacement out of the latch slot. When the jaws are opened the pin 31 may drop down and out from the slot 33, thereby effecting a disconnect between the harness belt latch assembly and lap belt anchor member. It should be pointed out that the jaws, although retaining the pin 31 in the slot 33, do not transmit tension forces between the harness belt and the lap belt; rather such forces are transmitted directly from the post 31 to the swivel end portion of the slot 33, against which the post bears under harness tension. Thus the belt force is transmitted through the post as a shearing force normal to the post axis, while the restraint against post disengagement is a tensile force in the post, transmitted from the jaws at the post groove. This latter tensile force is independent of the shearing force from impact loading, and is generally much lesser in magnitude.

Figure 7:
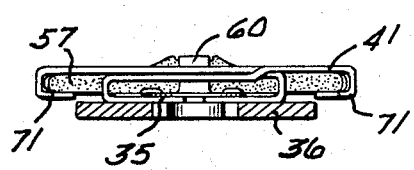
FIG. 7 is a sectional view of the latch assembly of the present invention taken on lines VII—VII of FIG. 6.

A special leaf spring to jaw lever engagement is effected by a channelform portion 71 of the finger lever, seen in FIGS. 6 and 7. The leaf spring 57 is not directly connected to the jaw arms 43, but rather guidably slides with respect thereto in the channels 71, all the while urging the jaw arms outwardly to close the jaws 35. This sliding contact delivers smoother, easier operation of the jaws, with less manual exertion. Also, were the ends of the leaf spring riveted or otherwise fixed to the levers 41, excessive bowing stresses would be generated in the spring, upon flexure thereof during jaw operation. These increased stresses would lead to increased spring fatigue, earlier spring failure, and earlier reduction of the spring coefficient. Moreover, special irregular, concentrated stresses would occur at the point of fastening the spring to the arm. It is apparent that the novel, channel sliding engagement provides a greatly improved and longer lived spring mechanism.

The entire apparatus works easily and quicky under the influence of one hand only, and may be connected or disconnected with rapidity. Yet, the apparatus will transmit extreme tensile forces between the shoulder belt and lap belt without disconnecting except when actuated to do so. At the same time the latch mechanism swivels easily and freely on the anchor structure, so that the harness belt easily swings on the lap belt to the angular orientation appropriate for untwisted extension to its connection point on the automobile frame or body, near the occupant's head.

Having described an operative preferred embodiment of my invention, others skilled in the art will perceive modifications, substitutions, and adaptation therefor, all of which are to be included within the spirit of the present invention.

We claim:

1. A quickly connectable and disconnectable swivel union for joining at least two separable structures, comprising:
   an anchor unit including
       a base plate member,
       a swivel post secured to said base and provided with a circumferential groove spaced from said base plate, and
       means for attaching said base plate to at least one of said separable structures; and
   a swivelling latch assembly including
       a latch frame with an elongate slot formed therein having a swivel end dimensioned to guidably receive and seat said swivel post,
       a pair of jaws each articulated from said from adjacent the swivel end of said slot and disposed to close in said circumferential groove and engage said swivel post, on a side of said latch frame opposite from the base plate of said anchor unit, thereby to constrain said post in said slot in seated relationship with said frame and with each freely rotatable with respect to each other,
       resilient means normally retaining said jaws closed in said circumferential groove, and release means for manually urging said jaws open to release said swivel post from said slot.

2. The structure of claim 1 in which said separable structures are belt elements.

3. The structure of claim 2 wherein said anchor unit is splicedly secured between the loose ends of at least two belt elements, and the latch assembly is attached to a third belt element.

4. In vehicular passenger safety equipment which combines a lap belt with a shoulder harness belt; a swivelling connector for joining one end of the should belt to the lap belt, comprising:
   an anchor unit, having
       a base plate portion securely fixed to said lap belt,
       a swivel post projecting from said plate and defining a circumferential groove spaced from said plate;
   a swivelling latch mechanism including
       a latch frame connected to said one end of said shoulder belt, and formed with an elongate slot portion having a swivel end dimensioned to guidably, shearingly, seat said swivel post,
       a pair of jaws articulated from said latch frame adjacent said swivel end of said slot and disposed to close upon said circumferential groove of said swivel post, on the side of said frame opposite from said base plate of said anchor unit, thereby to constrain said post in said swivel end of said slot for free rotational movement therein, resilient means for normally urging said jaws closed, and release means for urging said jaws open for release of said swivel post therefrom and disconnection of said latch mechanism from said swivel post,
           said release means comprising cross over arms manually squeezable together to open said jaws and thereby disconnect said latch mechanism from said swivel post.

5. The structure of claim 4 with the additional limitation that said resilient means comprise a leaf spring mounted to said frame with each end bowed outwardly against a portion of one of said cross over arms, thereby to hold said arms open, and, consequently, said jaws closed.

6. The structure of claim 5 in which each of said cross over arms includes a channelform portion into which one end of said leaf spring is slideably seated, to bowedly bear outwardly against the bottom of said channel and thereby hold said arms open and jaws closed.

7. The structure of claim 6, in which said means for connecting said base to said lap belt is a pair of end slots in opposite ends of said base plate, through each of which a loose end of said lap belt is looped and stitched.

8. The structure of claim 6 in which said latch frame is adjustably, knurl bar connected to said end of said harness belt.

9. The structure recited in claim 6, in which the latch assembly is interchanged with the anchor unit, so that said anchor is attached to one end of said harness belt and said assembly is attached to lap belt.

10. A quickly connectable and disconnectable swivel union for joining separable structures, comprising:
   an anchor unit, attached to one of said separable structures and having an upstanding swivel post portion with a circumferential groove formed thereon, intermediate the ends thereof;
   a swivelling latch assembly including
       a latch frame with an elongate slot having a swivel end formed therein as a shear transmitting seat for said swivel post,
       post retention means on said frame, adjacent said swivel end of said slot, and normally projecting into said groove and engaging said post, thereby to maintain said post in engagement with said shear transmitting seat and to arrest axial post motion relative to said slot, without substantially limiting axial rotation of said post in said slot, and means for releasing said post retention means from engagement with said post in said groove.

References Cited

UNITED STATES PATENTS

| | | | |
|---|---|---|---|
| 438,009 | 10/1890 | Levison | 24—223 |
| 1,178,135 | 4/1916 | Cowell | 24—223 |
| 1,247,258 | 11/1917 | Geisert. | |
| 2,446,951 | 8/1948 | Quilter. | |
| 3,378,301 | 4/1968 | Ramanzi, et al. | |
| 3,406,433 | 10/1968 | Frey | 24—223 |
| 393,400 | 11/1888 | Sharpneck | 285—114 |
| 493,719 | 3/1893 | Henderson | 285—114 |
| 928,367 | 7/1909 | Dewitt. | |
| 1,384,962 | 7/1921 | Kuhne | 285—114 |
| 2,059,456 | 11/1936 | Hodges. | |
| 2,348,100 | 5/1944 | Wadsworth | 24—125 X |
| 2,695,770 | 11/1954 | Stone. | |
| 3,397,431 | 8/1968 | Walker | 24—125 |

FOREIGN PATENTS 1,181,508   11/1964   Germany.

JAMES T. McCALL, Primary Examiner

U.S. Cl. X.R.

297—385; 24—223, 211, 230

UNITED STATES PATENT OFFICE
CERTIFICATE OF CORRECTION

Patent No. 3,526,432                 September 1, 1970

Jay Walter Jensen et al.

It is certified that error appears in the above identified patent and that said Letters Patent are hereby corrected as shown below:

Column 7, line 12, beginning with "393,400" cancel all to and including "24-125" in column 8, line 5.

Signed and sealed this 23rd day of March 1971.

(SEAL)
Attest:

Edward M. Fletcher, Jr.              WILLIAM E. SCHUYLER, JR.
Attesting Officer                    Commissioner of Patents